United States Patent Office 3,578,530
Patented May 11, 1971

3,578,530
ARRANGEMENT FOR CONSOLIDATING TIRE
BUILDING COMPONENTS
Ernest G. Nicholls, Balsall Common, near Coventry,
England, assignor to The Dunlop Company Limited,
London, England
Filed Mar. 8, 1968, Ser. No. 711,725
Claims priority, application Great Britain, Mar. 17, 1967,
12,612/67
Int. Cl. B29h *17/18*
U.S. Cl. 156—410                        6 Claims

ABSTRACT OF THE DISCLOSURE

A device for consolidating tire building components e.g. breakers, tread strips, on to a shaped carcass comprising a pair of freely rotatable rollers, pivotally mounted on a framework, and locatable symmetrically with respect to the mid-circumferential plane of the carcass. In use the framework, and hence the rollers, are resiliently urged against the component on the carcass so that the axes of rotation of the rollers tilt gradually about the pivotal mounts and successive parts of the roller peripheries engage with the parts of the component at gradually increasing distances from the mid-circumferential plane.

---

This invention relates to tire building machines.

During the manufacture of pneumatic tires it is necessary to consolidate building components, such as breaker or tread strips, onto the carcass of a tire on occasions when the carcass already is in a shaped form, i.e. when the carcass has an arched profile on its outer periphery. This is a difficult operation which in practice is carried out by hand utilising a roller tool.

It is an object of the present invention to provide a device for consolidating one or more tire components on to a shaped tire carcass.

According to the invention a device for consolidating at least one tire building component on to a profiled carcass comprises a framework, two rollers freely rotatably mounted on the framework and locatable one at each side of the mid-circumferential plane of the carcass, each of said rollers being mounted so that the axis of rotation thereof can gradually be tilted when the roller is applied to a component mounted on the carcass so that successive parts of the roller periphery will engage with parts of the component at gradually increasing distances from the mid-circumferential plane to consolidate said component onto the carcass, and a fluid damper and a spring for providing resistance to said roller tilting.

The length of each roller may be greater than the diameter thereof, said length being at least one half of the width of the widest component to be consolidated.

Preferably the fluid damper comprises an adjustable restricting valve through which a viscous fluid flows so that the damper may be adjusted to provide a predetermined resistance to the tilting motion. The damper and spring act in a similar manner to a vehicle shock absorber and thus the rate of tilting of the rollers and therefore consolidation of the component is adequate controlled.

The device may further comprise power-assisted means e.g. a pneumatic piston and cylinder mechanism, operable to urge the framework towards the carcass for causing the rollers to engage with the carcass.

One embodiment of the invention will now be described only by way of example with reference to the accompanying drawings of which:

Figure 1:
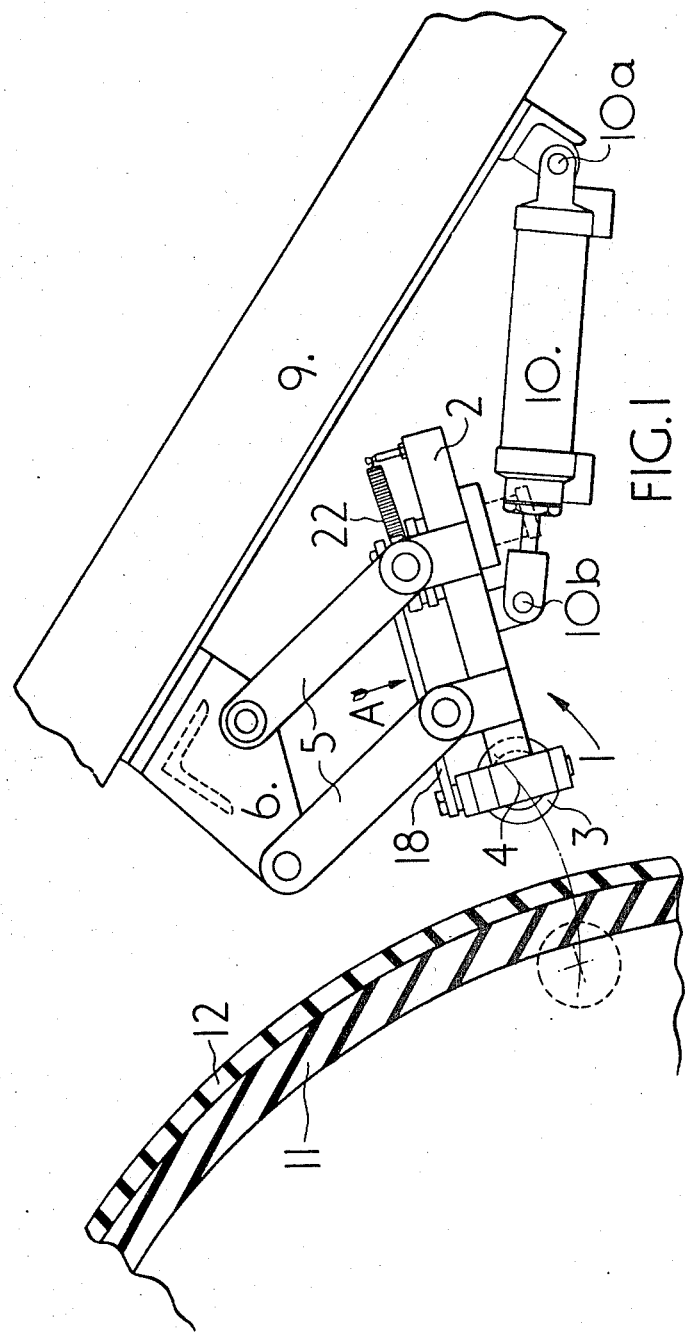
FIG. 1 shows a side view of the invention in position prior to use.

This device according to the invention is for the rolling consolidation of breakers on a radial ply tire carcass when in the shaped state and wherein the outer periphery of the shaped carcass has an outwardly arched profile.

The device 1 generally comprises a framework 2 carrying a pair of rollers 3 mounted in a manner to be described with their axis of rotation 4, in the untilted state, substantially parallel to the axis of rotation of a tire building drum (not shown).

The framework is freely mounted on two pairs of links 5, one pair pivotally mounted by their ends at each side (2a and 2b) of the framework, the other ends of each of the pairs of links being pivotally mounted on a bracket 6 on a supporting member 9 adjacent to the tire building drum. The links in each pair are parallel to one another. (The supporting member referred to here is part of a conveyor on which breaker strips are fed to the former and is described in detail in the specification of British Pat. No. 1,114,254.

A pneumatic piston and cylinder mechanism 10 is pivotally connected at both ends, one end 10a being connected to the support member and the other end 10b to the framework; it operates to move the framework and the rollers towards and away from a shaped carcass 11 mounted on the drum to cause the rollers to engage with a breaker 12 mounted on the carcass in a manner which will later be described.

Figure 2:
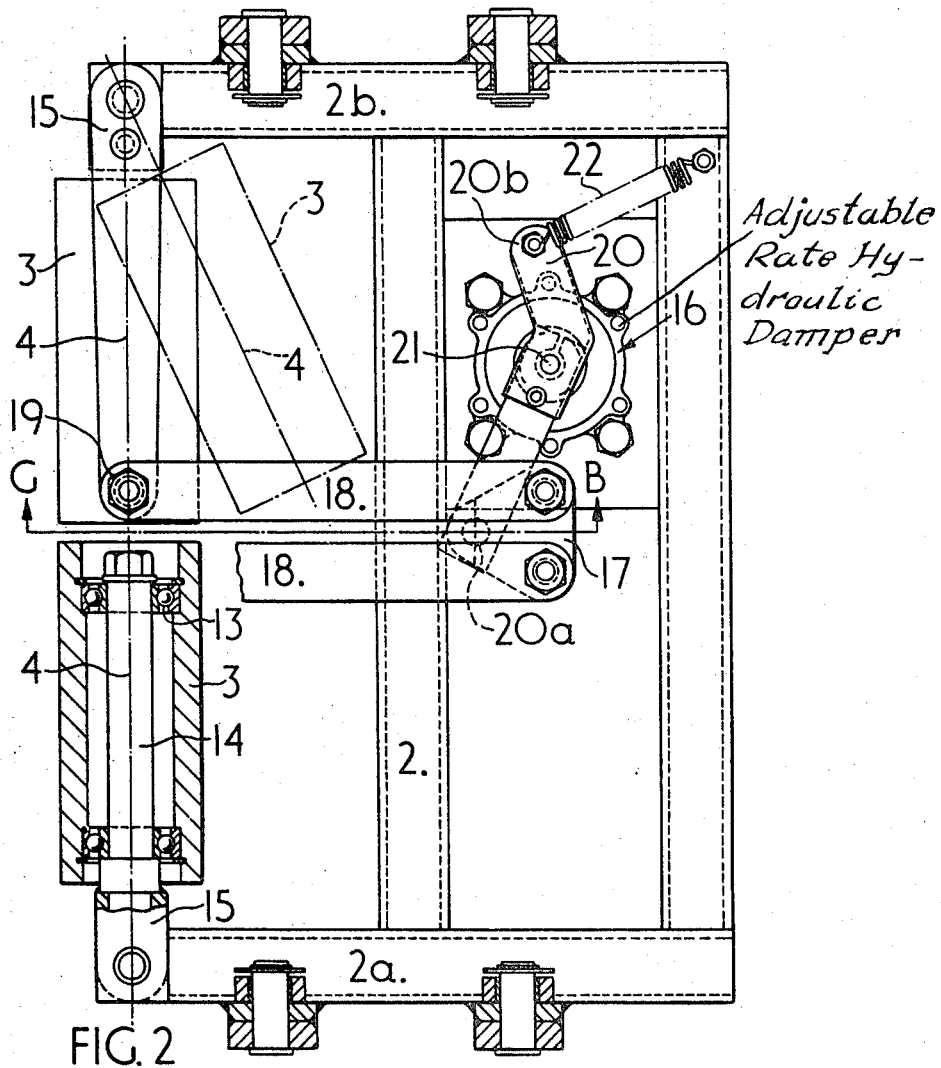
FIG. 2 is a plan, part sectional, view of the invention viewed in the direction of arrow A in FIG. 1 with certain parts omitted for clarity.
Figure 3:
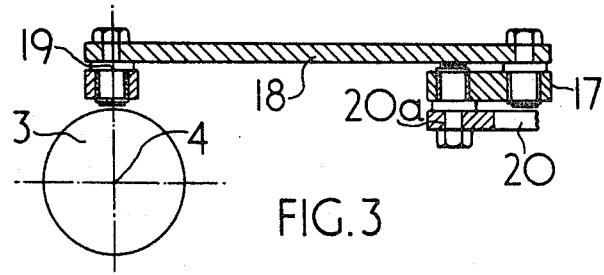
FIG. 3 is a part view, part section on the line B-G in FIG. 2.

Each of the rollers 3 is freely rotatably mounted on bearings 13 carried on a spindle 14 attached to a block 15 which is pivotally mounted to one side (2a or 2b) of the framework 2, pivotal rotation being possible from a position in which the axes of the rollers are co-axial (see full lines FIG. 2) to a position (shown in chain dotted lines in FIG. 2) in which the axes intersect at an obtuse angle, the rollers then being inclined one to another as and for a purpose which will be more fully appreciated when their operation on a tire breaker is described. Resistance to this tilting movement of the rollers out of co-axial relationship is provided by an adjustable-rate hydraulic damper 16 utilising a viscous medium which is capable of flowing through an adjustable restricting valve (not shown). A suitable adjustable-rate hydraulic damper for this purpose is sold by Kinetrol Limited, Farnham, Surrey, England, under the designation "Adjustable Rate Model 110–1100 lbs. ins./rad/sec." and is also described in British Pat. No. 859,839. The rollers are connected to the damper through a freely rocking plate 17, the rocking plate being connected by a pair of links 18 attached one to each of the rollers 3 by free pivotal connection 19 to an extension arm (not shown) attached to the associated roller. The rocking plate is also connected to one end 20a of an arm 20 drivably connected to the rotary part 21 of the damper, the other end 20b of this arm being connected to a return spring 22, attached to the framework, the tension of the spring tending to return the rollers to their co-axial relationship i.e. resisting the tilting movement of the rollers.

The operation of the device just described will now be explained in detail.

After the application of a breaker layer 12 to the outer periphery of a shaped carcass 11, the device is brought into operation to consolidate the breaker onto the carcass while the carcass is rotating. The pneumatic piston and cylinder mechanism 10 is actuated to bring the co-axially disposed rollers 3 into contact with the portion of the breaker adjacent to the mid-circumferential plane. The pressure provided by the piston and cylinder causes the rollers to bear firmly against the rotating breaker but this same pressure transmitted through the roller links 18 causes flow of the viscous medium in the damper 16 allowing the axes of the rollers gradually to tilt so that they form an obtuse angle one with the other.

It will be appreciated that this gradual tilting causes the points of contact of the rollers with the breaker gradually to move apart one from the other and mutually from the mid-circumferential plane of the carcass, the rollers operating each to trace out a spiral path of contact moving from the mid-circumferential plane axially outwards to a point just beyond the width of the breaker. The rollers are designed to have a greater length than diameter, their length being greater than half the width of the widest breaker which they are designed to consolidate.

The damper restricting valve can be adjusted so that the combination of damper, spring and piston and cylinder mechanism provides a close control of the speed at which the points of contact of the rollers with the tire moves axially outwardly from the mid-circumferential plane of the tire. Thus adequate consolidation can be effected under a variety of conditions i.e. the device can be used for consolidating any number of breaker layers onto a shaped carcass, for consolidating a variety of building components e.g. tread strips, filler strips, chafer strips, onto a crowned surface during the manufacture of a pneumatic tire, or for building any one of a range of tires of different sizes.

Having now described my invention, what I claim is:

1. A device for consolidating at least one tire building component onto a profiled carcass comprising a framework, two rollers freely rotatably mounted on the framework and locatable one at each side of the mid-circumferential plane of the carcass, means for applying said rollers to said component to be consolidated onto said profiled carcass, each of said rollers being mounted so that the axis of rotation thereof can gradually be tilted when the roller is applied to a component mounted on the carcass so that successive parts of the roller periphery will engage with parts of the component at gradually increasing distances from the mid-circumferential plane to consolidate said component on to the carcass, and hydraulic damper means mounted on said framework and mechanically coupled to said rollers for controlling the rate of tilting motion of said rollers.

2. A device according to claim 1 wherein the fluid damper comprises an adjustable restricting valve through which a viscous fluid flows so that the damper may be adjusted to provide a predetermined resistance to the tilting motion.

3. A device according to claim 2 comprising a freely rocking plate pivotally connected to the damper, a pair of links, each one of which is pivotally connected at both ends between the rocking plate and one roller, one link being associated with each roller, the plate and pair of links providing mechanical connection between the roller and the damper.

4. A device according to claim 1 comprising power-assisted means operable to urge the framework towards the carcass for causing the rollers to engage with the carcass.

5. A device according to claim 4 wherein the power-assisted means comprises a pneumatic piston and cylinder mechanism.

6. A device according to claim 4 and further comprising a return spring mounted on said framework and mechanically connected to said rollers to provide resistance to said tilting motion.

References Cited

UNITED STATES PATENTS

| | | | |
|---|---|---|---|
| 2,717,022 | 9/1955 | Duerksen | 156—408X |
| 3,056,448 | 10/1962 | Dearing | 156—421X |
| 3,162,563 | 12/1964 | Roesch | 156—412UX |

SAMUEL FEINBERG, Primary Examiner

S. C. BENTLEY, Assistant Examiner